United States Patent
Hoover et al.

(10) Patent No.: US 8,040,799 B2
(45) Date of Patent: Oct. 18, 2011

(54) NETWORK ON CHIP WITH MINIMUM GUARANTEED BANDWIDTH FOR VIRTUAL COMMUNICATIONS CHANNELS

(75) Inventors: Russell D. Hoover, Rochester, MN (US); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/121,168

(22) Filed: May 15, 2008

(65) Prior Publication Data

US 2009/0285222 A1    Nov. 19, 2009

(51) Int. Cl.
 *H04J 1/16* (2006.01)
(52) U.S. Cl. ........ 370/230; 370/389; 370/401; 370/254; 370/208
(58) Field of Classification Search .................. 370/401, 370/208, 389, 392, 254, 252
See application file for complete search history.

(56) References Cited

U.S. PATENT DOCUMENTS

| | | |
|---|---|---|
| 4,813,037 A | 3/1989 | Debuysscher et al. |
| 5,590,308 A | 12/1996 | Shih |
| 5,761,516 A | 6/1998 | Rostoker et al. |
| 5,870,479 A | 2/1999 | Feiken et al. |
| 5,884,060 A | 3/1999 | Vegesna et al. |
| 5,974,498 A | 10/1999 | Hartmann |
| 6,047,122 A | 4/2000 | Spiller |
| 6,085,315 A | 7/2000 | Fleck et al. |
| 6,101,599 A | 8/2000 | Wright et al. |
| 6,145,072 A | 11/2000 | Shams et al. |
| 6,151,668 A | 11/2000 | Pechanek et al. |
| 6,292,888 B1 | 9/2001 | Nemirovksy et al. |
| 6,446,171 B1 | 9/2002 | Henriksen |
| 6,561,895 B2 | 5/2003 | Scales |
| 6,567,895 B2 | 5/2003 | Scales |
| 6,668,308 B2 | 12/2003 | Barroso et al. |
| 6,675,284 B1 | 1/2004 | Warren |
| 6,725,317 B1 | 4/2004 | Bouchier et al. |

(Continued)

FOREIGN PATENT DOCUMENTS

CN    1599471    3/2005

OTHER PUBLICATIONS

Issenin et al.; (Date Reuse Driven Memory and network-on-Chip Co-Synthesis); NSF; pp. 1-7.*

(Continued)

*Primary Examiner* — Ricky Ngo
*Assistant Examiner* — Dewanda Samuel
(74) *Attorney, Agent, or Firm* — Biggers & Ohanian, LLP

(57) ABSTRACT

A network on chip ('NOC') with guaranteed minimum bandwidth for virtual communications channels, the NOC including: integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each router coupled for data communications with at least one other router through at least one link, each link including a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers.

9 Claims, 5 Drawing Sheets

U.S. PATENT DOCUMENTS

| | | | |
|---|---|---|---|
| 6,823,429 | B1 | 11/2004 | Olnowich |
| 6,891,828 | B2 | 5/2005 | Ngai |
| 6,915,402 | B2 | 7/2005 | Wilson et al. |
| 6,950,438 | B1 | 9/2005 | Owen et al. |
| 6,973,032 | B1 | 12/2005 | Casley et al. |
| 6,988,149 | B2 | 1/2006 | Odenwald |
| 7,072,996 | B2 | 7/2006 | Adusumilli et al. |
| 7,162,560 | B2 | 1/2007 | Taylor et al. |
| 7,376,789 | B2 | 5/2008 | Halleck et al. |
| 7,394,288 | B1 | 7/2008 | Agarwal |
| 7,398,374 | B2 | 7/2008 | DeLano |
| 7,464,197 | B2 | 12/2008 | Ganapathy et al. |
| 7,493,474 | B1 | 2/2009 | Pechanek et al. |
| 7,500,060 | B1 | 3/2009 | Anderson et al. |
| 7,502,378 | B2 | 3/2009 | Lajolo et al. |
| 7,521,961 | B1 | 4/2009 | Anderson et al. |
| 7,533,154 | B1 | 5/2009 | Chen et al. |
| 7,539,124 | B2* | 5/2009 | Rhim et al. .................. 370/208 |
| 7,546,444 | B1 | 6/2009 | Wolrich et al. |
| 7,568,064 | B2 | 7/2009 | Reblewski et al. |
| 7,590,774 | B2 | 9/2009 | Johns et al. |
| 7,689,738 | B1 | 3/2010 | Williams et al. |
| 2002/0099833 | A1 | 7/2002 | Steely et al. |
| 2002/0178337 | A1 | 11/2002 | Wilson et al. |
| 2003/0065890 | A1 | 4/2003 | Lyon |
| 2004/0083341 | A1 | 4/2004 | Robinson et al. |
| 2004/0088487 | A1 | 5/2004 | Barroso et al. |
| 2004/0151197 | A1 | 8/2004 | Hui |
| 2004/0250046 | A1 | 12/2004 | Gonzalez et al. |
| 2004/0260906 | A1 | 12/2004 | Landin et al. |
| 2005/0086435 | A1 | 4/2005 | Todoroki |
| 2005/0166205 | A1 | 7/2005 | Oskin et al. |
| 2005/0198442 | A1 | 9/2005 | Mandler |
| 2005/0203988 | A1 | 9/2005 | Nolle et al. |
| 2005/0238035 | A1 | 10/2005 | Riley |
| 2006/0203825 | A1* | 9/2006 | Beigne et al. ............ 370/395.42 |
| 2006/0209846 | A1 | 9/2006 | Clermidy et al. |
| 2006/0242393 | A1 | 10/2006 | Park et al. |
| 2007/0055826 | A1 | 3/2007 | Morton et al. |
| 2007/0076739 | A1 | 4/2007 | Manjeshwar et al. |
| 2008/0134191 | A1 | 6/2008 | Warrier et al. |
| 2008/0186998 | A1* | 8/2008 | Rijpkema ..................... 370/458 |
| 2008/0205432 | A1* | 8/2008 | Gangwal ...................... 370/458 |
| 2009/0083263 | A1 | 3/2009 | Felch et al. |
| 2009/0282222 | A1 | 11/2009 | Hoover et al. |

OTHER PUBLICATIONS

Kavaldijev et al. ("Providing QOS Guranteed in a NOC by Virtual Channel Reservation"); 2006; pp. 1-12.*
Monchiero ("Exploration of Distrubuted Shared Memory Architecture of NOC-Based Microprocessors", 2007) pp. 1-8.*
Al-Hashimi; ( "Sytem-on-Chip- Next Generation Electronics" , "Asynchronous on-chip networks"2006); Chapter 18 p. 1-32.*
Master Dissertation, University of Electronic Science and Technology of China, pp. 0-35 and pp. 36-81 (includes English abstract).
1994-2010 China Academic Journal Electronic Publishing House, pp. 0-30 and pp. 31-66 (includes English abstract).
Final Office Action, U.S. Appl. No. 11/972,753, filed Feb. 18, 2011.
Final Office Action, U.S. Appl. No. 12/015,975, filed Jan. 7, 2011.
Final Office Action, U.S. Appl. No. 12/108,846, filed Feb. 17, 2011.
Final Office Action, U.S. Appl. No. 12/113,286, filed Feb. 18, 2011.
Final Office Action, U.S. Appl. No. 12,118,059, filed Feb. 17, 2011.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip-Net Generation Electronics", "Asynchronous on-chip networks"2006); Chapter 18 p. 1-32.
Final Office Action, U.S. Appl. No. 11/926,212, filed Aug. 23, 2010.
Final Office Action, U.S. Appl. No. 11/955,553, filed Sep. 13, 2010.
Final Office Action, U.S. Appl. No. 12/031,733, filed Aug. 19, 2010.
Notice of Allowance, U.S. Appl. No. 12/118,298, filed Aug. 18, 2010.
Office Action, U.S. Appl. No. 11/972,753, filed Oct. 4, 2010.
Office Action, U.S. Appl. No. 12/015,975, filed Jul. 22, 2010.
Office Action, U.S. Appl. No. 11/937,579, filed Sep. 16, 2010.
Office Action, U.S. Appl. No. 12/118,059, filed Sep. 1, 2010.
Office Action, U.S. Appl. No. 12/121,168, filed Oct. 5, 2010.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, filed Dec. 7, 2010.
Office Action, U.S. Appl. No. 11/945,396, filed Dec. 9, 2010.
Notice of Allowance, U.S. Appl. No. 11/955,553, filed Nov. 22, 2010.
Notice of Allowance, U.S. Appl. No. 12/031,733, filed Nov. 16, 2010.
Office Action, U.S. Appl. No. 12/118,017, filed Dec. 8, 2010.
Office Action, U.S. Appl. No. 12/118,272, filed Dec. 2, 2010.
Office Action, U.S. Appl. No. 12/108,846, filed Dec. 2, 2010.
Final Office Action, U.S. Appl. No. 12/117,875, filed Nov. 10, 2010.
Office Action, U.S. Appl. No. 12/117,906, filed May 9, 2008.
Office Action, U.S. Appl. No. 12/060,559, filed Nov. 3, 2010.
Advisory Action, U.S. Appl. No. 11/926,212, filed Nov. 2, 2010.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action Dated Jan. 29, 2010 in U.S. Appl. No. 11/945,396.
Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
INTEL, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.

Bolotin, et al. "The Power of Priority: NoC based Distributed Cache Coherency". Published May 21, 2007, pp. 117-126, ISBN 0-7695-2773-06/07 by IEEE.

Office Action Dated Mar. 24, 2010 in U.S. Appl. No. 12/031,733.

Virtanen, et al. "NoC Interface for a Protocol Processor". University of Turku.

Walter, et al., "BENoC: A Bus-Enhanced Network on-Chip". Dec. 2007, Technion, Israel Institute of Technology, Haifa, Israel.

Office Action Dated Jun. 8, 2010 in U.S. Appl. No. 12/118,298.

Office Action Dated May 26, 2010 in U.S. Appl. No. 12/117,875.

* cited by examiner

NETWORK ON CHIP WITH MINIMUM GUARANTEED BANDWIDTH FOR VIRTUAL COMMUNICATIONS CHANNELS

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

A network on chip ('NOC') with guaranteed minimum bandwidth for virtual communications channels, the NOC including: integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each router coupled for data communications with at least one other router through at least one link, each link including a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
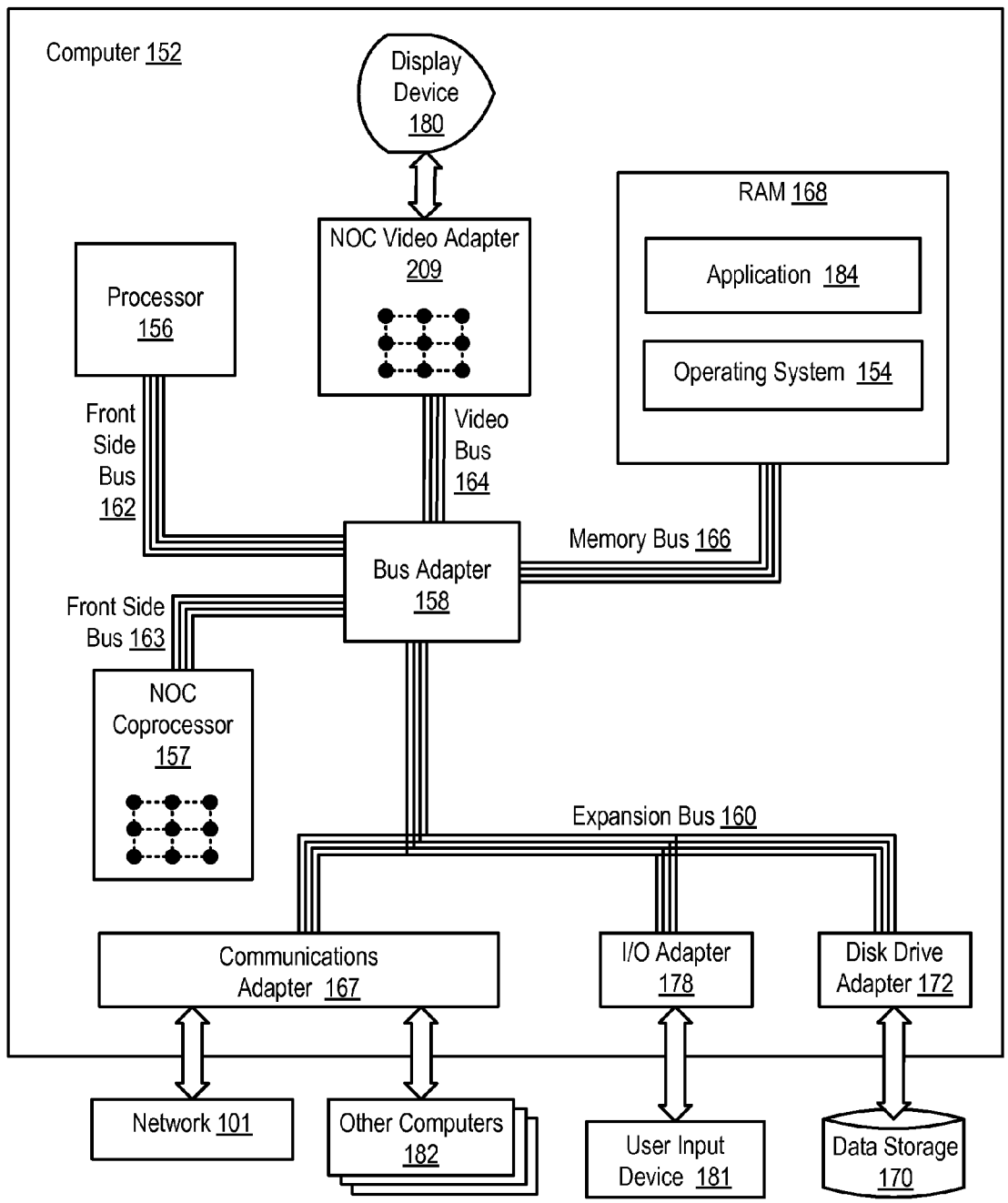
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

Each router in the example NOCs of FIG. 1 implements two or more virtual communications channels where each virtual communications channel is characterized by a communication type and each virtual communications channel is guaranteed at least a minimum bandwidth for data transmissions over a link between routers.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
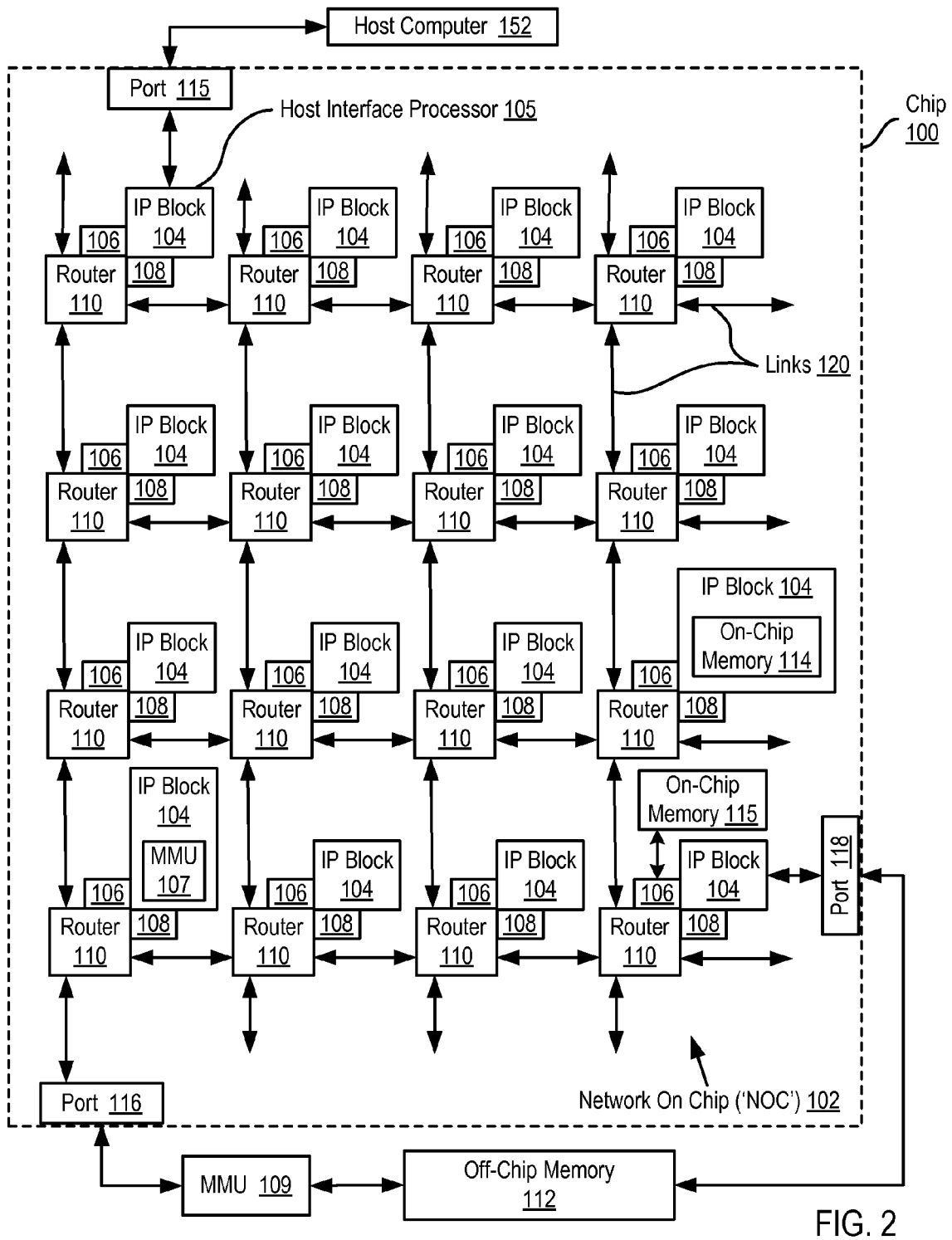
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each router (110) in the example of FIG. 2 implements two or more virtual communications channels where each virtual communications channel is characterized by a communication type and each virtual communications channel is guaranteed at least a minimum bandwidth for data transmissions over a link between routers.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
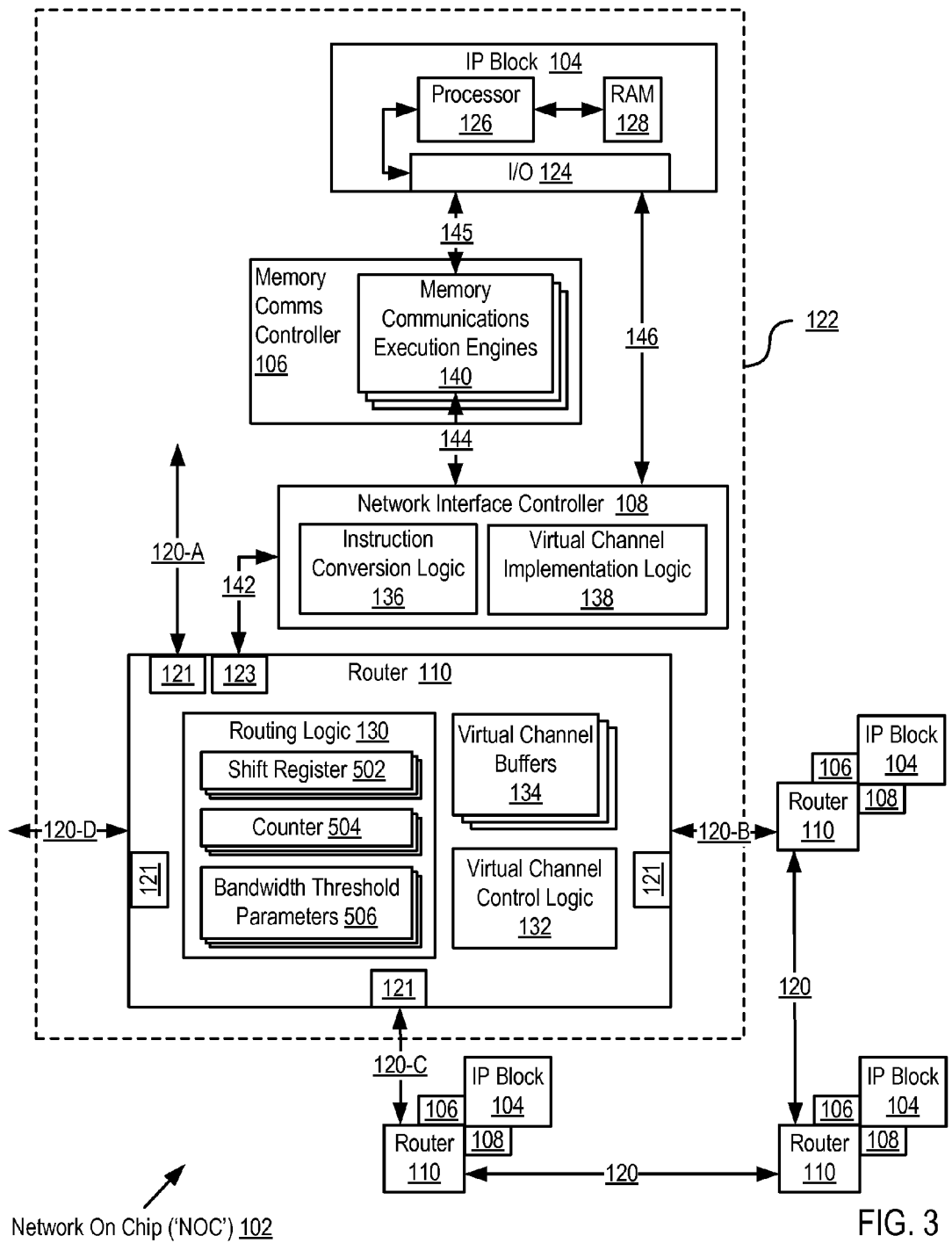
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate with off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

The routing logic (130) of the exemplary NOC (102) of FIG. 3 includes associated shift registers (502), counters (504), and bandwidth parameters (506). The shift registers (502) include a separate shift register for each virtual communications channel for each link (120) of each router (110). Each shift register (502) shifts, at a periodic rate, such as a clock cycle, a value representing a transmission of at least a portion of a packet in a virtual communications channel on a link. That is, on each clock cycle for which a packet or portion of a packet is transmitted in a particular virtual communications channel, a value representing such a transmission is entered into the shift register. Such a value is shifted through the shift register on subsequent clock cycles. On each clock cycle for which no packet or portion of a packet is transmitted in the particular virtual communications channel, a value representing no transmission is entered into the shift register. Such a value is shifted through the shift register on subsequent clock cycles. Consider, as an example, that a 'one' bit represents a transmission of a packet or portion of a packet in a virtual communications channel, and a 'zero' bit represents no transmission of a packet or portion of a packet in a virtual communications channel. In such an example, a 'one' is entered into a shift register for each clock cycle that a packet or portion of packet is transmitted in a virtual communications channel, a 'zero' is entered into a shift register for each clock cycle that no packet or portion of a packet is transmitted in a virtual communications channel, and for each clock cycle, the values in the shift register are shifted.

As mentioned above, the routing logic (130) includes shift registers (502) which in turn include a separate shift register for each virtual communications channel for each link (120) of each router. That is, the routing logic (130) includes one shift register per link per virtual communications channel. Consider, for example, that the router (110) of the expanded set (122) implements two virtual communications channels, a memory communications channel and a data communications channel. The router (110) of FIG. 3 includes five links (120A-120D, and 142). The routing logic (130) for such a router (110) having five links and implementing two virtual communications channels includes ten shift registers, each shift register associated with a counter (504) and bandwidth threshold parameters (506).

The counters (504) of the routing logic (130) in the example NOC (102) of FIG. 3 include a counter for each virtual communications channel for each link (120) of the router (110). Each counter (504) is incremented on each entry into a corresponding shift register (502) of a value representing a transmission of a portion of a packet and each counter (504) is decremented upon exit from a corresponding shift register of a value representing a transmission of a portion of a packet. The value of the counter represents the total bandwidth utilized by an associated virtual communications channel.

The bandwidth threshold parameters (506) of the routing logic (130) in the example NOC (102) of FIG. 3 include data representing bandwidth maxima for each virtual communications channel for each link. Using bandwidth maxima as a threshold guarantees guaranteed minimum for each virtual communications channel because the maximum bandwidth allowed any one particular virtual communications channel is capped.

Each virtual communications channel of the exemplary NOC (102) of FIG. 3 is guaranteed at least a minimum bandwidth for data transmissions over a link between routers. Each of the virtual communications channels may be guaranteed such a minimum bandwidth for data transmissions over a link between routers by suspending transmissions of another virtual communications channel when the virtual communications channel's bandwidth utilization exceeds a predetermined threshold. For further explanation consider Table 1 below.

TABLE 1

Associated Shift Registers And Counters For Virtual Communications Channels Guaranteed A Minimum Bandwidth By Suspending Transmission Of Another Virtual Communications Predetermined Bandwidth Threshold = 3

| Clock Cycle | VC 1 Trans. | VC 2 Trans. | VC 1 Shift Register | VC 2 Shift Register | VC 1 Counter | VC 2 Counter |
|---|---|---|---|---|---|---|
| 1 | Yes | No | 10000000 | 00000000 | 1 | 0 |
| 2 | Yes | Attempt/Wait | 11000000 | 00000000 | 2 | 0 |
| 3 | No | Yes | 01100000 | 10000000 | 2 | 1 |
| 4 | No | Yes | 00110000 | 11000000 | 2 | 2 |
| 5 | No | Yes | 00011000 | 11100000 | 2 | 3 |
| 6 | No | Yes | 00001100 | 11110000 | 2 | 4 |
| 7 | No | Suspend | 00000110 | 01111000 | 2 | 4 |
| 8 | Yes | Suspend | 10000011 | 00111100 | 3 | 4 |
| 9 | No | Suspend | 01000001 | 00011110 | 2 | 4 |
| 10 | Yes | Suspend | 10100000 | 00001111 | 3 | 4 |
| 11 | No | No | 01010000 | 00000111 | 3 | 3 |
| 12 | No | No | 00101000 | 00000011 | 3 | 2 |
| 13 | Attempt/Wait | Yes | 00010100 | 10000001 | 2 | 3 |

Table 1 includes values of associated shift registers and counters for two virtual communications channels, VC 1 and VC 2, over 13 clock cycles where minimum bandwidth is guaranteed to each virtual communications channel by suspending transmission in a virtual communications channel when that virtual communications channel's bandwidth utilization exceeds a predetermined threshold. An eight-bit shift register is depicted in Table 1 for ease of explanation. Readers of skill in the art will recognize, however, that shift registers of any size may be used in NOCs in accordance with embodiments of the present invention. Table 1 also includes indications of whether a packet or portion of a packet was transmitted in a particular virtual communications channel on a particular clock cycle.

The predetermined threshold used in the example of Table 1 for both virtual communications channels is three. That is, upon incrementing the value of counter associated with a virtual communications channel to four, transmissions in the virtual communications channel are thereafter suspended until the counter is decremented to a value of three. Although the same predetermined bandwidth threshold is used for both virtual communications channels in Table 1, readers of skill in the art will recognize that in NOCs according to embodiments of the present invention, each virtual communications channel may have an associated predetermined bandwidth threshold different from that of other virtual communications channels. Readers of skill in the art will also recognize that in NOCs according to embodiments of the present invention, each virtual communications channel may have an associated predetermined bandwidth threshold that is much larger than three, depending upon the size of the shift register. For example, with a shift register of 100 bits, one virtual channel may have a predetermined bandwidth threshold of 30, while another virtual channel may have a predetermined bandwidth threshold of 70.

In Table 1, VC 1 and VC 2 are of the same priority. In cases of equal priority, a round robin approach may be used to determine the next virtual communications channel in which to send a packet or portion of a packet when a packet or portion of a packet is ready for transmission in more than one virtual communications channel. Packets ready for transmission on a particular clock cycle in more than one virtual communications channel are referred to in this specification as 'competing packets.' At clock cycle 2 of Table 1, for example, competing packets or a portion of competing packets are ready for transmission in both VC 1 and VC 2. In this case, a data packet or portion of a data packet is transmitted in VC 1 and the data packet or portion of a data packet ready for transmission in VC 2 is held in the virtual channel buffer for VC 2 until the next clock cycle. Upon the next clock cycle on which there is an attempt to transmit a packet or portion of a packet in both virtual communications channels, such as clock cycle 13 in Table 1, transmission of a packet or portion of a packet in a virtual communications channel is controlled by the round robin approach and a packet or portion of a packet is transmitted in VC 2 while the competing packet or portion of a competing packet is held in the virtual channel buffer for VC 1 until the next clock cycle, assuming that transmission for VC 2 is not suspended.

As can be seen in the example Table 1, upon a transmission of a packet or portion of a packet in a virtual communications channel a '1' is entered into a shift register associated with the virtual communications channel and upon such entry of a '1' into a shift register, the value of an associated counter is incremented. If no packet or portion of a packet is transmitted, on a particular clock cycle, in a virtual communications channel a 0 is entered into an associated shift register. In table 1, on each clock cycle, the bits in each shift register are shifted from left to right.

When a '1' exits from the shift register, the value of the associated counter is decremented. Consider clock cycles 11 and 12 in Table 1, for example. On clock cycle 11, the counter for VC 2 is decremented from 4 to 3, and on clock cycle 12, the counter for VC 2 is decremented from 3 to 2.

On clock cycle 6 in Table 1, the counter for VC 2 is incremented to four, that is, the value of the counter for VC 2 exceeds the predetermined bandwidth threshold of three. On the next clock cycle, transmissions of packets or portion of packets in VC 2 are suspended. Transmissions of packets or portion of packets in VC 2 remain suspended for clock cycles 7-10, until the counter for VC 2 is decremented to a value equal to the predetermined bandwidth threshold, which occurs on clock cycle 11.

In addition to suspending transmissions of a another virtual communications channel, lowering the priority of transmissions for another virtual communications channel when that virtual communications channel's bandwidth utilization exceeds a predetermined threshold may also be used to guarantee for a virtual communications channel a minimum bandwidth for data transmissions over a link between routers. Consider Table 2 below as an example of such lowering of priority.

TABLE 2

Associated Shift Registers And Counters For Virtual Communications Channels Guaranteed A Minimum Bandwidth By Lowering The Priority Of Transmission Of Another Virtual Communications
Predetermined Bandwidth Threshold = 3

| Clock Cycle | VC 1 Trans. | VC 2 Trans. | VC 1 Shift Register | VC 2 Shift Register | VC 1 Counter | VC 2 Counter |
|---|---|---|---|---|---|---|
| 1 | Yes | No | 10000000 | 00000000 | 1 | 0 |
| 2 | Attempt/Wait | Yes | 01000000 | 10000000 | 1 | 1 |
| 3 | Yes | No | 10100000 | 01000000 | 2 | 1 |
| 4 | No | Yes | 01010000 | 10100000 | 2 | 2 |
| 5 | No | Yes | 00101000 | 11010000 | 2 | 3 |
| 6 | No | Yes | 00010100 | 11101000 | 2 | 4 |
| 7 | No | Yes | 00001010 | 11110100 | 2 | 5 |
| 8 | Yes | Attempt/Wait | 10000101 | 01111010 | 3 | 5 |
| 9 | No | Yes | 01000010 | 10111101 | 2 | 6 |
| 10 | Yes | Attempt/Wait | 10100001 | 01011110 | 3 | 5 |
| 11 | No | Yes | 01010000 | 10101111 | 2 | 6 |
| 12 | No | No | 00101000 | 01010111 | 2 | 5 |
| 13 | Yes | Attempt/Wait | 10010100 | 10101011 | 3 | 4 |

Table 2 includes values of associated shift registers and counters for two virtual communications channels, VC 1 and VC 2, over 13 clock cycles where minimum bandwidth is guaranteed to each virtual communications channel by lowering priority of transmission for another virtual communications channel when that virtual communications channel's bandwidth utilization exceed a predetermined threshold. Table 2 also includes indications of whether a packet or portion of a packet was transmitted in a particular virtual communications channel on a particular clock cycle.

The predetermined bandwidth threshold used in the example of Table 2 for both virtual communications channels is three. That is, upon incrementing the value of counter associated with a virtual communications channel to four, priority of transmissions in the virtual communications channel is thereafter lowered until the counter is decremented to a value of three. Although the same predetermined bandwidth threshold is used for both virtual communications channels in Table 2, readers of skill in the art will recognize that in NOCs according to embodiments of the present invention, each virtual communications channel may have an associated predetermined bandwidth threshold different from that of other virtual communications channels.

In Table 2, transmissions of packets or portions of packets in VC 2 are initially of higher priority than those of VC 1. Packets or portions of packets to be transmitted in a virtual communications channel of higher priority are preferred to those packets or portions of packets to be transmitted in a virtual communications channel of lower priority. Packets for transmission in higher priority virtual channel may be transmitted in various ways. Packets for transmission in higher priority virtual channel, for example, may always be sent on a clock cycle prior to a competing packet awaiting transmission in a lower priority virtual communications channel. Alternatively, packets for transmission in a higher priority virtual communications channel may be sent on a clock cycle prior to a competing packet awaiting transmission in a virtual channel of lower priority a particular number of occurrences, such as three out every four occurrences. On clock cycle 2 in Table 2, a packet or portion of a packet is transmitted in VC 2 while the competing packet remains in the virtual channel buffer for VC 1, the virtual communications channel of lower priority, until clock cycle 3.

In contrast to the example of Table 1, packets are transmitted in a virtual channel utilizing bandwidth that exceeds a predetermined threshold when transmission for virtual communications channels of higher priority is not attempted. On clock cycles 6, 7, 9 and 11, for example, packets are transmitted in VC 2, regardless of the fact that by clock cycle 5, VC 2 has utilized bandwidth that exceeds the bandwidth threshold. This consumption of available bandwidth by a lower priority virtual communications channel may be useful in an NOC executing multiple applications where at least one application requires a guaranteed minimum bandwidth in a virtual communications channel to operate effectively, but only intermittently consumes the entire guaranteed minimum bandwidth during operation, such as for example, a voice over IP ('VOIP') application. Other applications using other virtual communications channels of lower priority may use bandwidth when available.

Figure 4:
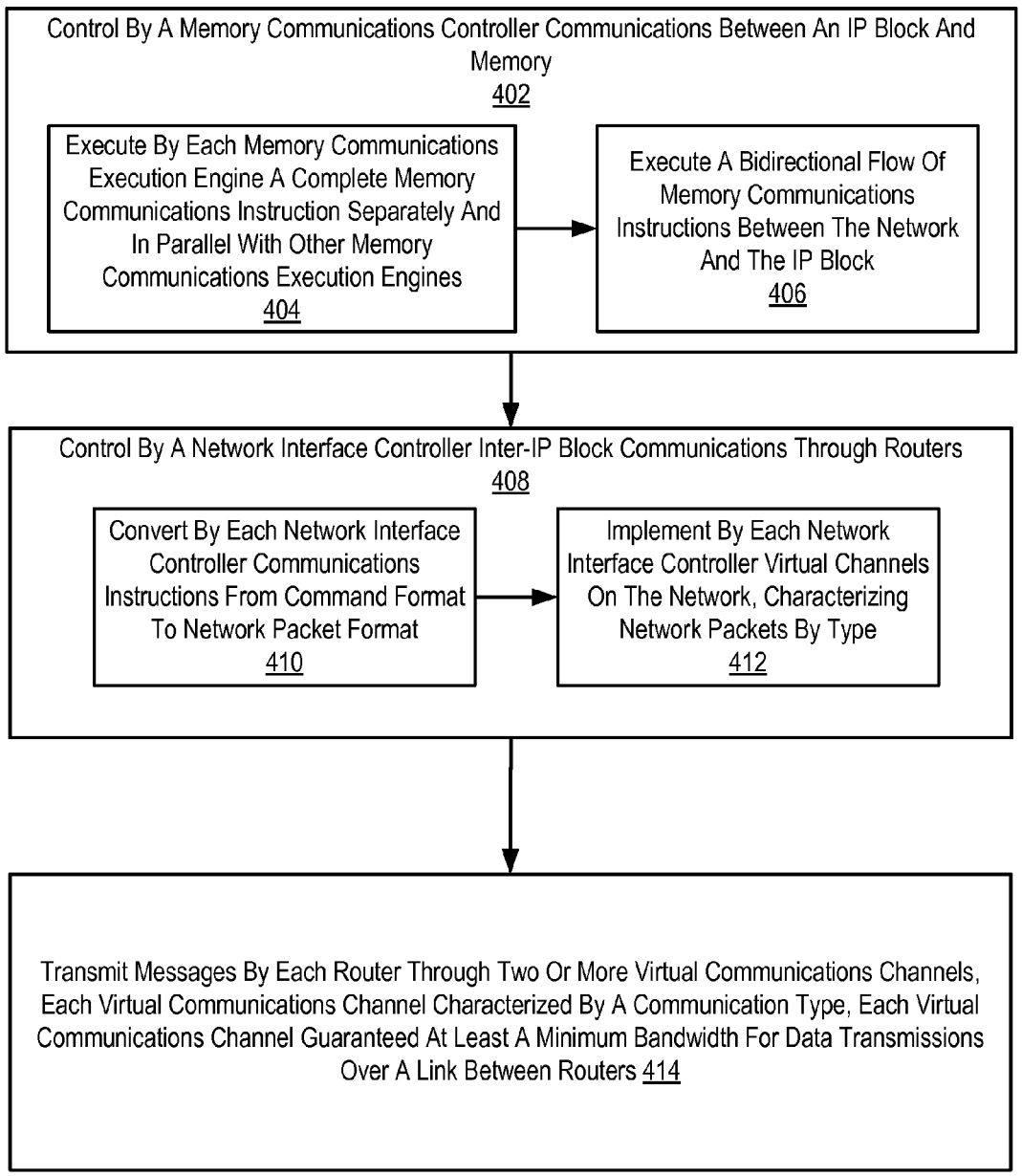
FIG. 4 sets forth a flow chart illustrating an exemplary method for data processing with a NOC with minimum guaranteed bandwidth for virtual communications according to embodiments of the present invention.

For further explanation, FIG. 4 sets forth a flow chart illustrating an exemplary method for data processing with a NOC with minimum guaranteed bandwidth for virtual communications according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type and each virtual communications channel is guaranteed at least a minimum bandwidth for data transmissions over a link between routers. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 5:
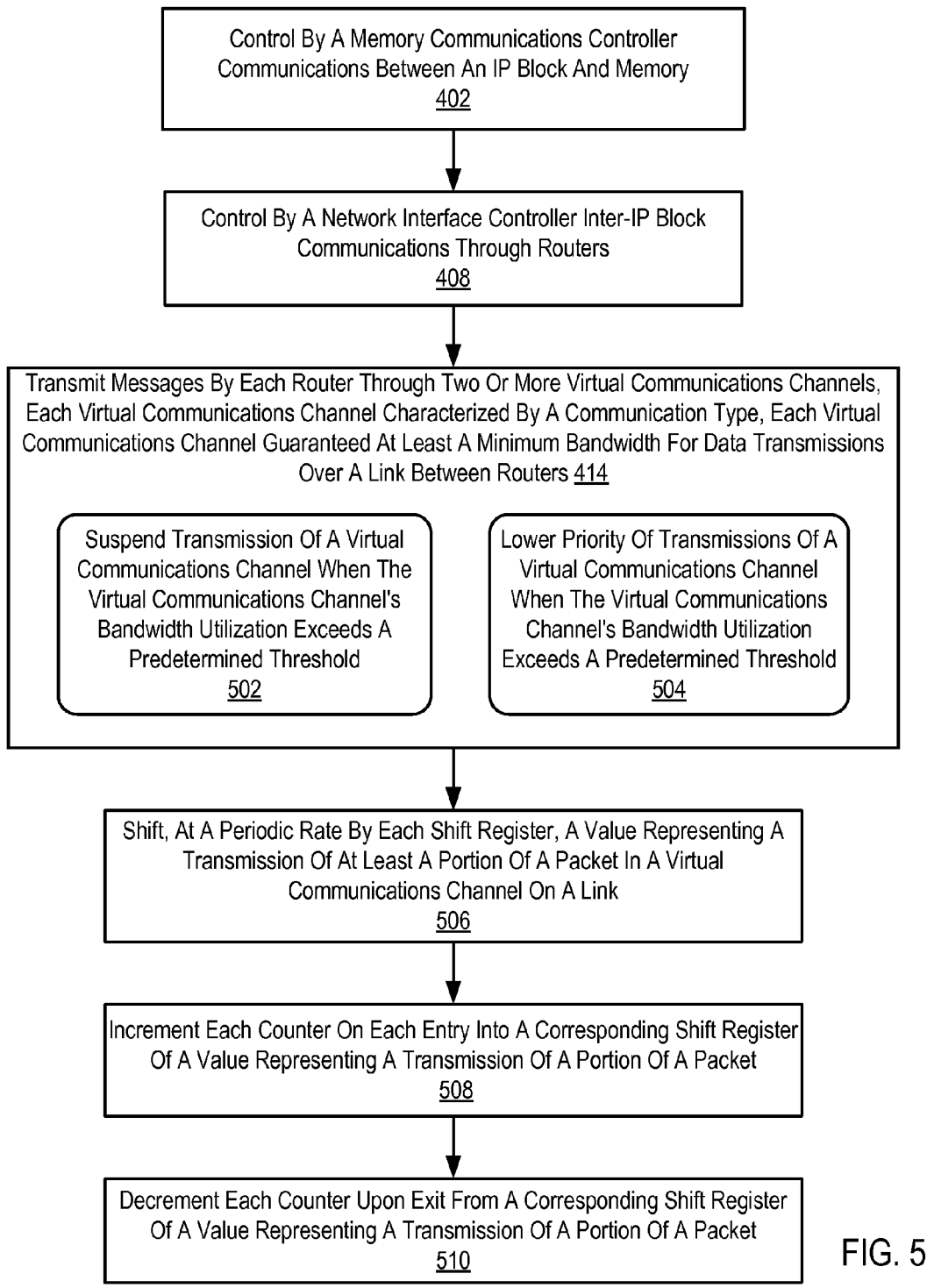
FIG. 5 sets forth a flow chart illustrating a further exemplary method for data processing with a NOC with minimum guaranteed bandwidth for virtual communications according to embodiments of the present invention.

For further explanation, FIG. 5 sets forth a flow chart illustrating a further exemplary method for data processing with a NOC with minimum guaranteed bandwidth for virtual communications according to embodiments of the present invention. The method of FIG. 5, like the method of FIG. 4, is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 5 is similar to the method of FIG. 4 including, as it does, controlling (402) by a memory communications controller (106 on FIG. 3) communications between an IP block and memory, controlling (408) by a network interface controller (108 on FIG. 3) inter-IP block communications through routers, and transmitting (414) messages by each router (110 on FIG. 3) through two or more virtual communications channels, where each virtual communications channel is characterized by a communication type and each virtual communications channel is guaranteed at least a minimum bandwidth for data transmissions over a link between routers.

The method of FIG. 5 differs from the method of FIG. 4, however, in that each router of the NOC on which the method of FIG. 5 is implemented includes routing logic that, in turn, includes associated shift registers (502 on FIG. 3), counters (504 on FIG. 3), and bandwidth parameters (506 on FIG. 3). The shift registers (502 on FIG. 3) include a separate shift register for each virtual communications channel for each link of each router. The counters (504 on FIG. 3) include a counter for each virtual communications channel for each link. The bandwidth threshold parameters (506 on FIG. 3) include data representing bandwidth maxima for each virtual communications channel for each link.

The method of FIG. 5 also differs from the method of FIG. 4 in that the method of FIG. 5 includes shifting (506), at a periodic rate by each shift register (502 on FIG. 3), a value representing a transmission of at least a portion of a packet in a virtual communications channel on a link. A periodic rate may be implemented as, for example, a clock cycle The method of FIG. 5 also includes incrementing (508) each counter on each entry into a corresponding shift register (502 on FIG. 3) of a value representing a transmission of a portion of a packet and decrementing (510) each counter upon exit from a corresponding shift register (502 on FIG. 3) of a value representing a transmission of a portion of a packet.

In the method of FIG. 5 transmitting (414) messages by each router (110 on FIG. 3) through two or more virtual communications channels, where each virtual communications channel is characterized by a communication type and each virtual communications channel is guaranteed at least a minimum bandwidth for data transmissions over a link between routers may be carried out by suspending (502) transmission of a virtual communications channel when the virtual communications channel's bandwidth utilization exceeds a predetermined threshold.

Transmitting (414) messages by each router (110 on FIG. 3) through two or more virtual communications channels, where each virtual communications channel is characterized by a communication type and each virtual communications channel is guaranteed at least a minimum bandwidth for data transmissions over a link between routers may alternatively be carried out by lowering (504) priority of transmissions of a virtual communications channel when the virtual communications channel's bandwidth utilization exceeds a predetermined threshold.

Exemplary embodiments of the present invention are described largely in the context of a fully functional computer system for data processing with a NOC. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip ('NOC') with guaranteed minimum bandwidth for virtual communications channels, the NOC comprising:

integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each router coupled for data communications with at least one other router through at least one link, each link comprising a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers by another virtual communications channel for which transmissions are suspended when that virtual communications channel's bandwidth utilization exceeds a predetermined threshold.

2. A network on chip ('NOC') with guaranteed minimum bandwidth for virtual communications channels, the NOC comprising:

integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each router coupled for data communications with at least one other router through at least one link, each link comprising a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers by another virtual communications channel for which transmissions are lowered in priority when that virtual communications channel's bandwidth utilization exceeds a predetermined threshold.

3. A network on chip ('NOC') with guaranteed minimum bandwidth for virtual communications channels, the NOC comprising:

integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each router coupled for data communications with at least one other router through at least one link, each link comprising a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers, each router further comprising routing logic that includes associated shift registers, counters, and bandwidth parameters, the shift registers including a separate shift register for each virtual communications channel for each link of each router, each shift register shifting, at a periodic rate, a value representing a transmission of at least a portion of a packet in a virtual communications channel on a link, the counters including a counter for each virtual communications channel for each link, each counter incremented on each entry into a corresponding shift register of a value representing a transmission of a portion of a packet, each counter decremented upon exit from a corresponding shift register of a value representing a transmission of a portion of a packet, and the bandwidth threshold parameters comprising data representing bandwidth maxima for each virtual communications channel for each link.

4. A network on chip ('NOC') with guaranteed minimum bandwidth for virtual communications channels, the NOC comprising:

integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers, each network interface controller is enabled to convert communications instructions from command format to network packet format and implement virtual channels on the network, characterizing network packets by type, each router coupled for data communications with at least one other router through at least one link, each link comprising a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers.

5. A network on chip ('NOC') with guaranteed minimum bandwidth for virtual communications channels, the NOC comprising:

integrated processor ('IP') blocks, routers, memory communications controllers, and network interface controllers, each IP block adapted to a router through a memory communications controller and a network interface controller, each IP block enabled to bypass the IP block's memory communications controller and send inter-IP block, network-addressed communications directly to the network through that IP block's network interface controller, each memory communications controller controlling communications between an IP block and memory, each network interface controller controlling inter-IP block communications through routers, each router coupled for data communications with at least one other router through at least one link, each link comprising a wire bus wide enough to accommodate simultaneously, for transmission in one direction on the link, all or part of a data switching packet, each router implementing two or more virtual communications channels, each virtual communications channel characterized by a communication type, each virtual communications channel guaranteed at least a minimum bandwidth for data transmissions over a link between routers.

6. A method of data processing with a network on chip ('NOC') with minimum guaranteed bandwidth for virtual communications channels, the NOC comprising:

IP blocks, routers, memory communications controllers, and network interface controllers, each IP block adapted to a router through a memory communications controller and a network interface controller, the method comprising:

controlling by each memory communications controller communications between an IP block and memory, and controlling by each network interface controller inter-IP block communications through routers, each router coupled for data communications with at least one other router through at least one link, each link comprising a wire bus wide enough to accommodate simultaneously, for transmission in one direction on the link, all or part of a data switching packet, transmitting messages by each router through two or more virtual communications channels, each virtual communications channel characterized by a communication type, each virtual communications channel guaranteed at least a minimum bandwidth for data transmissions over a link between routers, including suspending transmission of a virtual communications channel when the virtual communications channel's bandwidth utilization exceeds a predetermined threshold.

7. A method of data processing with a network on chip ('NOC') with minimum guaranteed bandwidth for virtual communications channels, the NOC comprising:

IP blocks, routers, memory communications controllers, and network interface controllers, each IP block adapted to a router through a memory communications controller and a network interface controller, the method comprising:

controlling by each memory communications controller communications between an IP block and memory, and controlling by each network interface controller inter-IP block communications through routers, each router coupled for data communications with at least one other router through at least one link, each link comprising a wire bus wide enough to accommodate simultaneously, for transmission in one direction on the link, all or part of a data switching packet, transmitting messages by each router through two or more virtual communications channels, each virtual communications channel characterized by a communication type, each virtual communications channel guaranteed at least a minimum bandwidth for data transmissions over a link between routers, including lowering priority of transmissions of a virtual communications channel when the virtual communications channel's bandwidth utilization exceeds a predetermined threshold.

8. A method of data processing with a network on chip ('NOC') with minimum guaranteed bandwidth for virtual communications channels, the NOC comprising:

IP blocks, routers, memory communications controllers, and network interface controllers, each IP block adapted to a router through a memory communications controller and a network interface controller, each router comprising routing logic that includes associated shift registers, counters, and bandwidth parameters, the shift registers including a separate shift register for each virtual communications channel for each link of each router, the counters including a counter for each virtual communications channel for each link, the bandwidth threshold parameters comprising data representing bandwidth maxima for each virtual communications channel for each link, the method comprising:

controlling by each memory communications controller communications between an IP block and memory;

controlling by each network interface controller inter-IP block communications through routers, each router coupled for data communications with at least one other router through at least one link, each link comprising a wire bus wide enough to accommodate simultaneously, for transmission in one direction on the link, all or part of a data switching packet;

transmitting messages by each router through two or more virtual communications channels, each virtual communications channel characterized by a communication type, each virtual communications channel guaranteed at least a minimum bandwidth for data transmissions over a link between routers;

shifting, at a periodic rate by each shift register, a value representing a transmission of at least a portion of a packet in a virtual communications channel on a link;

incrementing each counter on each entry into a corresponding shift register of a value representing a transmission of a portion of a packet; and decrementing each counter upon exit from a corresponding shift register of a value representing a transmission of a portion of a packet.

9. A method of data processing with a network on chip ('NOC') with minimum guaranteed bandwidth for virtual communications channels, the NOC comprising:

IP blocks, routers, memory communications controllers, and network interface controllers, each IP block adapted to a router through a memory communications controller and a network interface controller, the method comprising:

controlling by each memory communications controller communications between an IP block and memory;

controlling by each network interface controller inter-IP block communications through routers, each router coupled for data communications with at least one other router through at least one link, each link comprising a wire bus wide enough to accommodate simultaneously, for transmission in one direction on the link, all or part of a data switching packet, including converting by each network interface controller communications instructions from command format to network packet format and implementing by each network interface controller virtual channels on the network, characterizing network packets by type; and transmitting messages by each router through two or more virtual communications channels, each virtual communications channel characterized by a communication type, each virtual communications channel guaranteed at least a minimum bandwidth for data transmissions over a link between routers.

* * * * *